United States Patent
Coady et al.

(10) Patent No.: US 12,493,809 B2
(45) Date of Patent: Dec. 9, 2025

(54) QUANTUM PROCESS DUPLICATION

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

(*) Notice: Subject to any disclaimer, the term of this patent is extended or adjusted under 35 U.S.C. 154(b) by 1326 days.

(21) Appl. No.: 17/184,131

(22) Filed: Feb. 24, 2021

(65) Prior Publication Data

US 2022/0269964 A1    Aug. 25, 2022

(51) Int. Cl.
*G06N 10/40* (2022.01)
*G06F 9/54* (2006.01)

(52) U.S. Cl.
CPC ............ *G06N 10/40* (2022.01); *G06F 9/547* (2013.01)

(58) Field of Classification Search
CPC ............................... G06N 10/40; G06F 9/547
See application file for complete search history.

(56) References Cited

U.S. PATENT DOCUMENTS

| 2012/0110574 | A1* | 5/2012 | Kumar | G06F 9/45558 718/1 |
| 2019/0141016 | A1 | 5/2019 | Borrill | |
| 2020/0174836 | A1* | 6/2020 | Gunnels | G06F 9/5044 |
| 2020/0401427 | A1* | 12/2020 | Gambetta | G06F 9/455 |
| 2021/0173660 | A1* | 6/2021 | Hogaboam | G06F 9/3851 |
| 2021/0279625 | A1* | 9/2021 | Shani | G06F 15/16 |

FOREIGN PATENT DOCUMENTS

| CN | 108768640 A | 11/2018 |
| CN | 109714261 A | 5/2019 |
| CN | 111930294 A | 11/2020 |
| KR | 101349455 B1 | 1/2014 |

OTHER PUBLICATIONS

Peng, Chong, et al. "Massively Parallel Quantum Chemistry: A high-performance research platform for electronic structure." The Journal of Chemical Physics 153.4 (2020). (Year: 2020).*
Wang, Minghao, et al., "Duplicating Classical Bits with Universal Quantum Cloning Machine," Science China—Physics, Mechanics & Astronomy, vol. 62, No. 3, Article No. 30312, Mar. 2019, pp. 030312-1-030312-5, available online at https://link.springer.com/article/10.1007/s11433-018-9296-3.
Wang, Minghao, et al., "Filling the Gap Between Quantum No-Cloning and Classical Duplication," Mar. 2018, 5 pages, available online at https://arxiv.org/abs/1803.05602.

* cited by examiner

*Primary Examiner* — Markus A. Vasquez
(74) *Attorney, Agent, or Firm* — Dority & Manning, P.A.

(57) ABSTRACT

Quantum process duplication is disclosed herein. In one embodiment, a processor device receives a request to duplicate a first quantum process that is associated with a first one or more qubits. The processor device obtains metadata associated with the first quantum process and its qubits, wherein the metadata includes an identifier of the first quantum process and an identifier of each of the first one or more qubits. The processor device then duplicates the first quantum process as a second quantum process. Finally, the quantum process manager associates a second one or more qubits with the second quantum process (e.g., by associating the first one or more qubits with the second quantum process as the second one or more qubits, or by allocating a new set of one or more qubits for the second quantum process as the second one or more qubits, as non-limiting examples).

20 Claims, 7 Drawing Sheets

QUANTUM PROCESS DUPLICATION

BACKGROUND

Quantum computing involves the use of quantum bits, referred to herein as "qubits," each of which has properties (such as superposition and entanglement) that differ from those of non-quantum bits used in classical computing. As quantum computing continues to increase in popularity and become more commonplace, an ability to manage quantum processes that access one or more qubits will be desirable.

SUMMARY

The examples disclosed herein implement a quantum process duplication mechanism that enables a quantum process to be duplicated, including associating or allocating qubits with the duplicated quantum process.

In one example, a method for performing quantum process duplication is disclosed. The method comprises receiving, by a quantum computing device, a request to duplicate a first quantum process associated with a first one or more qubits. The method further comprises obtaining metadata associated with the first quantum process, wherein the metadata comprises an identifier of the first quantum process and an identifier of each of the first one or more qubits. The method also comprises duplicating the first quantum process as a second quantum process based on the metadata. The method additionally comprises associating a second one or more qubits with the second quantum process based on the metadata.

In another example, a quantum computing device for performing quantum process duplication is disclosed. The quantum computing device comprises a system memory and a processor device coupled to the system memory. The processor device is to receive a request to duplicate a first quantum process associated with a first one or more qubits. The processor device is further to obtain metadata associated with the first quantum process, wherein the metadata comprises an identifier of the first quantum process and an identifier of each of the first one or more qubits. The processor device is also to duplicate the first quantum process as a second quantum process based on the metadata. The processor device is additionally to associate a second one or more qubits with the second quantum process based on the metadata.

In another example, a computer program product is provided. The computer program product comprises a non-transitory computer-readable medium having stored thereon computer-executable instructions which, when executed, cause a processor device to receive a request to duplicate a first quantum process associated with a first one or more qubits. The computer-executable instructions further cause the processor device to obtain metadata associated with the first quantum process, wherein the metadata comprises an identifier of the first quantum process and an identifier of each of the first one or more qubits. The computer-executable instructions also cause the processor device to duplicate the first quantum process as a second quantum process based on the metadata. The computer-executable instructions additionally cause the processor device to associate a second one or more qubits with the second quantum process based on the metadata.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
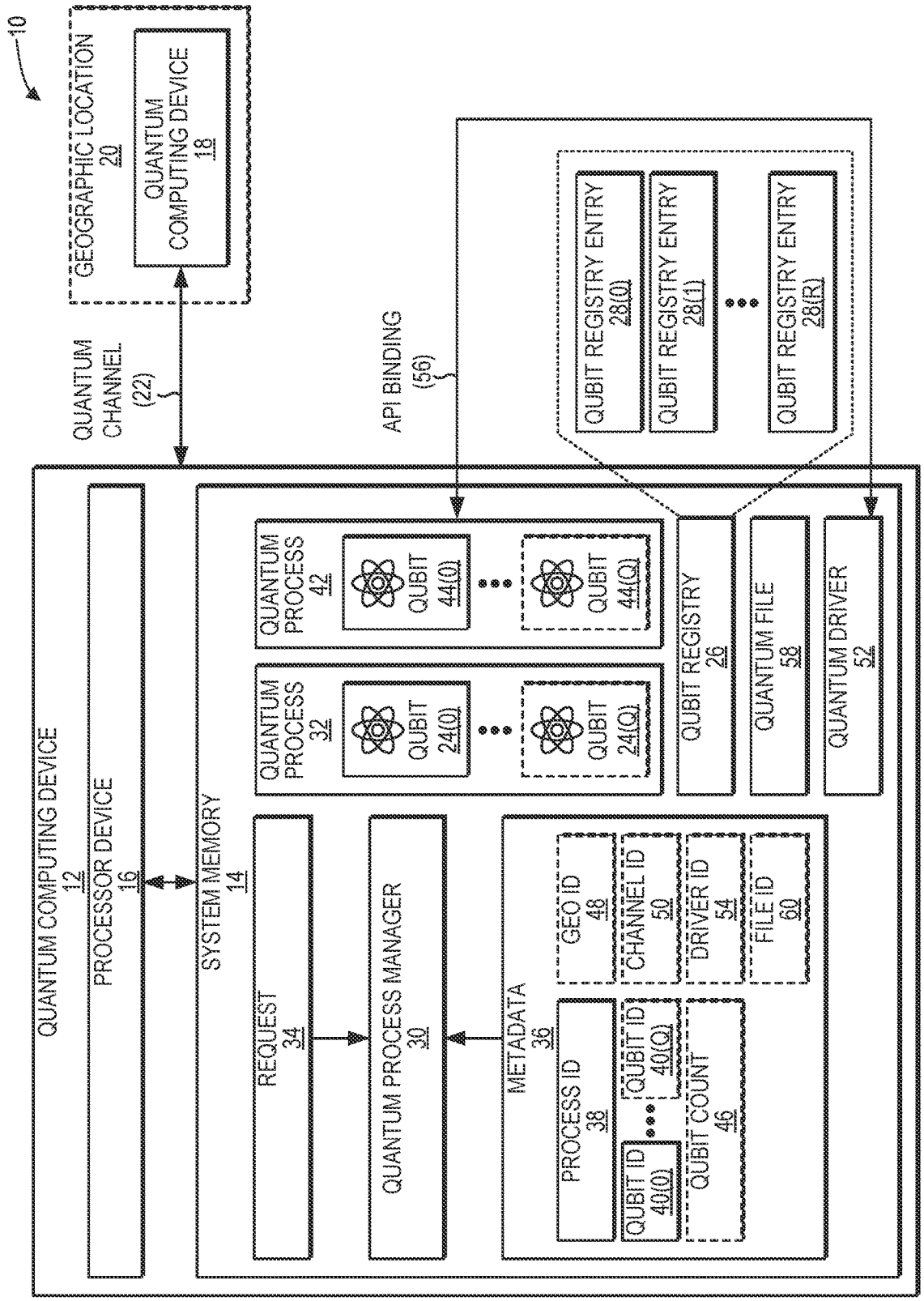
FIG. 1 is a block diagram of a quantum computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum process" and "second quantum process," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such as superposition and entanglement) that differ from those of non-quantum bits used in classical computing. As quantum computing continues to increase in popularity and become more commonplace, an ability to manage quantum processes that access one or more qubits will be desirable.

In this regard, examples disclosed herein implement a quantum process duplication mechanism that enables a quantum process to be duplicated, including associating or allocating qubits with the duplicated quantum process. The term "quantum process" and derivatives thereof are used herein to refer to a process that executes on a quantum computing device, and that accesses one or more qubits to provide a desired functionality. The term "quantum process duplication" and derivates thereof are used herein to refer to operations for cloning or otherwise creating a copy of an existing quantum process, including creating a new process that executes a same set of computer-executable instructions as the existing quantum process, and/or associating the duplicated quantum process with the same or similar computing resources as the existing quantum process (including associating the duplicated quantum process with existing qubits and/or allocating new qubits for use by the duplicated quantum process). To perform a quantum process duplication operation, a quantum process manager, executing on a processor device of a quantum computing device, receives a request to duplicate a first quantum process that is associated with a first one or more qubits. The quantum process manager obtains metadata associated with the first quantum process and its qubits (e.g., from the quantum process manager and/or from a qubit registry, as non-limiting examples). The metadata includes an identifier of the first quantum process and an identifier of each of the first one or more qubits.

The quantum process manager then duplicates the first quantum process as a second quantum process in a manner analogous to conventional duplication of a classical computing process. Finally, the quantum process manager associates a second one or more qubits with the second quantum process. In embodiments in which the second quantum process is to share existing qubits with the first quantum process (i.e., the second one or more qubits are the same as the first one or more qubits), the quantum process manager may associate the first one or more qubits with the second quantum process by, for example, updating qubit registry entries of a qubit registry. For embodiments in which the second quantum process is to utilize a dedicated set of qubits, the quantum process manager may allocate the second one or more qubits for the second quantum process based on a count of the first one or more qubits provided by the metadata. The quantum process manager in some embodiments may also perform additional operations, such as associating a quantum channel or a quantum file with the second quantum process based on the metadata, and/or by creating an application programming interface (API) binding to a quantum driver for the second quantum process based on the metadata.

FIG. 1 is a block diagram of a quantum computing system 10 according to one example. The quantum computing system 10 includes a quantum computing device 12 that comprises a system memory 14 and a processor device 16, and also includes a quantum computing device 18 that includes constituent elements similar to those of the quantum computing device 12 and provides functionality corresponding to the functionality attributed herein to the quantum computing device 12. It is to be understood that the quantum computing system 10 according to some examples may include other classical computing devices and/or additional quantum computing devices that are not illustrated in FIG. 1. Additionally, the quantum computing device 12 and the quantum computing device 18 in some examples may include constituent elements in addition to those illustrated in FIG. 1.

The quantum computing device 12 and the quantum computing device 18 in the example of FIG. 1 may be close in physical proximity to one another or may be relatively long distances from one another. For example, the quantum computing device 18 may be located at a geographic location 20 that is distant from a location of the quantum computing device 12. The quantum computing device 12 and the quantum computing device 18 operate in quantum environments but can operate using classical computing principles or quantum computing principles. When using quantum computing principles, the quantum computing device 12 and the quantum computing device 18 perform computations that utilize quantum-mechanical phenomena, such as superposition and/or entanglement states. The quantum computing device 12 and the quantum computing device 18 each may operate under certain environmental conditions, such as at or near zero degrees (0°) Kelvin. When using classical computing principles, the quantum computing device 12 and the quantum computing device 18 utilize binary digits that have a value of either zero (0) or one (1). The quantum computing device 12 and the quantum computing device 18 may be communicatively coupled via a conventional classical network connection (not shown) and/or via a quantum channel 22 over which qubits may be transmitted.

In the example of FIG. 1, the quantum computing device 12 implements a first set of one or more qubits 24(0)-24(Q). To maintain information for the first qubit(s) 24(0)-24(Q), the quantum computing device 12 includes a qubit registry 26, which comprises a plurality of qubit registry entries 28(0)-28(R) each corresponding to a qubit such as the first one or more qubits 24(0)-24(Q). The qubit registry 26 in some embodiments maintains data regarding the qubits implemented by the quantum computing device 12, such as a count of the total number of qubits implemented by the quantum computing device 12 and a count of the number of available qubits that are currently available for allocation, as non-limiting examples. Each of the qubit registry entries 28(0)-28(R) also stores qubit metadata (not shown) for a corresponding qubit. The qubit metadata may include, as non-limiting examples, an identifier of the corresponding qubit, an availability indicator that indicates whether the corresponding qubit is available for use or is in use by a specific quantum process, an identifier of a quantum process associated with the corresponding qubit, and/or an entanglement indicator that indicates whether the corresponding qubit is in an entangled state.

To provide functionality for managing quantum processes, the quantum computing device 12 in the example of FIG. 1 provides a quantum process manager 30. The quantum process manager 30 maintains quantum process metadata (not shown) that includes data for each quantum process executing on the quantum computing device 12. The quantum process metadata may include, as non-limiting examples, a unique process identifier for a corresponding quantum process (i.e., a process identifier unique to a specific instance of a quantum process), a process name of the quantum process (i.e., a name for the quantum process that remains the same over multiple instances), an internet protocol (IP) address associated with the quantum process, an identifier of qubits utilized by the quantum process, and/or a name and location of a Quantum Assembly Language (QASM) file that implements the quantum process.

It is to be understood that, because the quantum process manager 30 is a component of the quantum computing device 12, functionality implemented by the quantum process manager 30 may be attributed to the quantum computing system 10 generally. Moreover, in examples where the quantum process manager 30 comprises computer-executable software instructions that program the processor device 16 to carry out functionality discussed herein, functionality implemented by the quantum process manager 30 may be attributed herein to the processor device 16. It is to be further understood that while, for purposes of illustration only, the quantum process manager 30 is depicted as a single component, the functionality implemented by the quantum process manager 30 may be implemented in any number of components, and the examples discussed herein are not limited to any particular number of components.

In exemplary operation, at a point in time prior to that illustrated in FIG. 1, the quantum process manager 30 receives a request (not shown), from a user or from a quantum application, to initiate a quantum process 32 (also referred to herein as a "first quantum process 32"). The quantum process manager 30 causes an allocation of a memory space (not shown) for the quantum process 32, and initiates the quantum process 32 in the memory space via a QASM file (not shown). The quantum process manager 30 generates metadata for the quantum process 32, and may also analyze and parse the QASM file from which the quantum process 32 was initiated to determine the first one or more qubits 24(0)-24(Q) that are utilized by the quantum process 32. The quantum process manager 30 may then store the metadata for the quantum process 32, and may also cause qubit metadata in the qubit registry 26 corresponding to the first one or more qubits 24(0)-24(Q) to be updated to indicate that the first one or more qubits 24(0)-24(Q) are associated with the quantum process 32.

One function provided by the quantum process manager 30 of FIG. 1 is quantum process duplication operations to duplicate quantum processes such as the quantum process 32. Accordingly, in the example of FIG. 1, the quantum process manager 30 receives a request 34 to duplicate the quantum process 32 (e.g., from a requestor such as a user or a quantum application). In response to receiving the request 34, the quantum process manager 30 obtains metadata 36 associated with the quantum process 32. The metadata 36 may be obtained from one or more different sources, such as from quantum process metadata maintained by the quantum process manager, from qubit metadata maintained by the qubit registry 26, and/or from the request 34 itself, as non-limiting examples. The metadata 36 includes, at a minimum, an identifier 38 (captioned "PROCESS ID" in FIG. 1) of the quantum process 32, as well as one or more identifiers 40(0)-40(Q) (captioned "QUBIT ID" in FIG. 1) of each of the one or qubits 24(0)-24(Q) associated with the quantum process 32.

The quantum process manager 30 in some embodiments may first verify that the quantum process 32 is valid and running. The quantum process manager 30 then duplicates the quantum process 32 as a quantum process 42 (also referred to herein as a "second quantum process 42") in a manner analogous to duplicating or cloning a process in conventional classical computing. The quantum process manager 30 also associates a second one or more qubits 44(0)-44(Q) with the quantum process 42 based on the metadata 36.

In some embodiments, operations performed by the quantum process manager 30 for associating the second one or more qubits 44(0)-44(Q) with the quantum process 42 may include determining that the quantum process 42 is to share qubits with the "parent" quantum process 32. Accordingly, the second one or more qubits 44(0)-44(Q) may be the same qubits as the first one or more qubits 24(0)-24(Q), and the quantum process manager 30 may associate the first one or more qubits 24(0)-24(Q) with the quantum process 42 (e.g., by updating the appropriate qubit registry entries 28(0)-28(R) of the qubit registry 26 to indicate that the first one or more qubits 24(0)-24(Q) are associated with both the quantum process 32 and the quantum process 42). The quantum process manager 30 in such embodiments may perform access control operations as needed to control access to the first one or more qubits 24(0)-24(Q) when they are shared between the quantum process 32 and the quantum process 42.

Some embodiments may provide that operations performed by the quantum process manager 30 for associating the second one or more qubits 44(0)-44(Q) with the quantum process 42 include determining that the quantum process 42 is to be allocated a dedicated set of one or more qubits, rather than sharing the first one or more qubits 24(0)-24(Q) with the quantum process 32. To assist with allocating qubits, the metadata 36 in such embodiments may include a count 46 (captioned "QUBIT COUNT" in FIG. 1) of the first one or more qubits 24(0)-24(Q) associated with the quantum process 32. Using the count 46, the quantum process manager 30 may allocate the second one or more qubits 44(0)-44(Q) for the quantum process 42. Some such embodiments may allow the second one or more qubits 44(0)-44(Q) to be allocated from a store of qubits at a particular geographic location, such as the geographic location 20. In such embodiments, the metadata 36 may additionally include an identifier 48 (captioned "GEO ID" in FIG. 1) of the geographic location 20, and the quantum process manager 30 may allocate the second one or more qubits 44(0)-44(Q) at the geographic location 20 based on the identifier 48 of the geographic location 20.

The quantum process manager 30 in some embodiments may perform additional operations as part of duplicating the quantum process 32. For instance, the quantum process 32 may be active on a particular quantum channel such as the quantum channel 22, and thus it may be desirable for the quantum process 42 generated by the quantum process duplication operation to also have access to the quantum channel 22. Accordingly, in such embodiments, the metadata 36 may include an identifier 50 (captioned "CHANNEL ID" in FIG. 1) of the quantum channel 22, and the quantum process manager 30 may associate the quantum process 42 with the quantum channel 22 based on the identifier 50 of the quantum channel 22.

Similarly, the quantum computing device 12 may provide one or more quantum drivers such as the quantum driver 52. The quantum driver 52 is analogous to a conventional device driver in classical computing, and may encapsulate quantum-specific functionality, such as functionality related to entanglement, superdense encoding, and the like. As such, the quantum driver 52 may be accessed by a quantum process via an application programming interface (API) binding between the quantum process and the quantum driver 52. In embodiments in which the quantum process 32 utilizes the quantum driver 52, the metadata 36 may include an identifier 54 (captioned "DRIVER ID" in FIG. 1) of the quantum driver 52, and the quantum process manager 30 may create an API binding 56 to the quantum driver 52 for the quantum process 42 based on the identifier 54 of the quantum driver 52.

The quantum process 32 in some embodiments may also be associated with a quantum file 58, which may be implemented as a collection of qubits (not shown). Accordingly, it may be desirable for the quantum process 42 generated by the quantum process duplication operation to also be associated with the quantum file 58. Thus, the metadata 36 in such embodiments may include an identifier 60 (captioned "FILE ID" in FIG. 1) of the quantum file 58, and the quantum process manager 30 may associate the quantum process 42 with the quantum file 58 based on the identifier 60 of the quantum file 58.

Figure 2A:
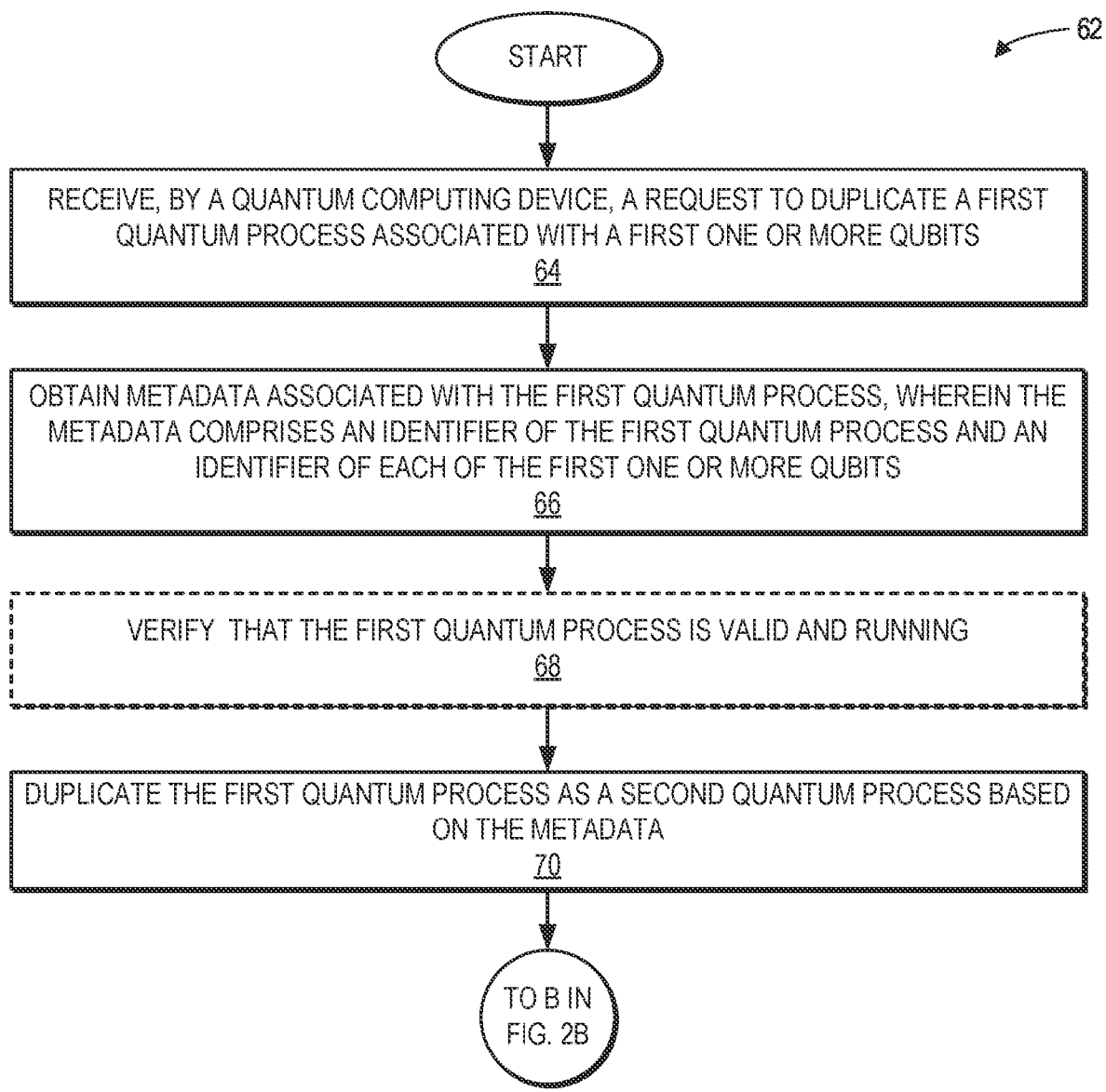
FIGS. 2A-2C are flowcharts illustrating operations for performing quantum process duplication, according to one example.
Figure 2B:
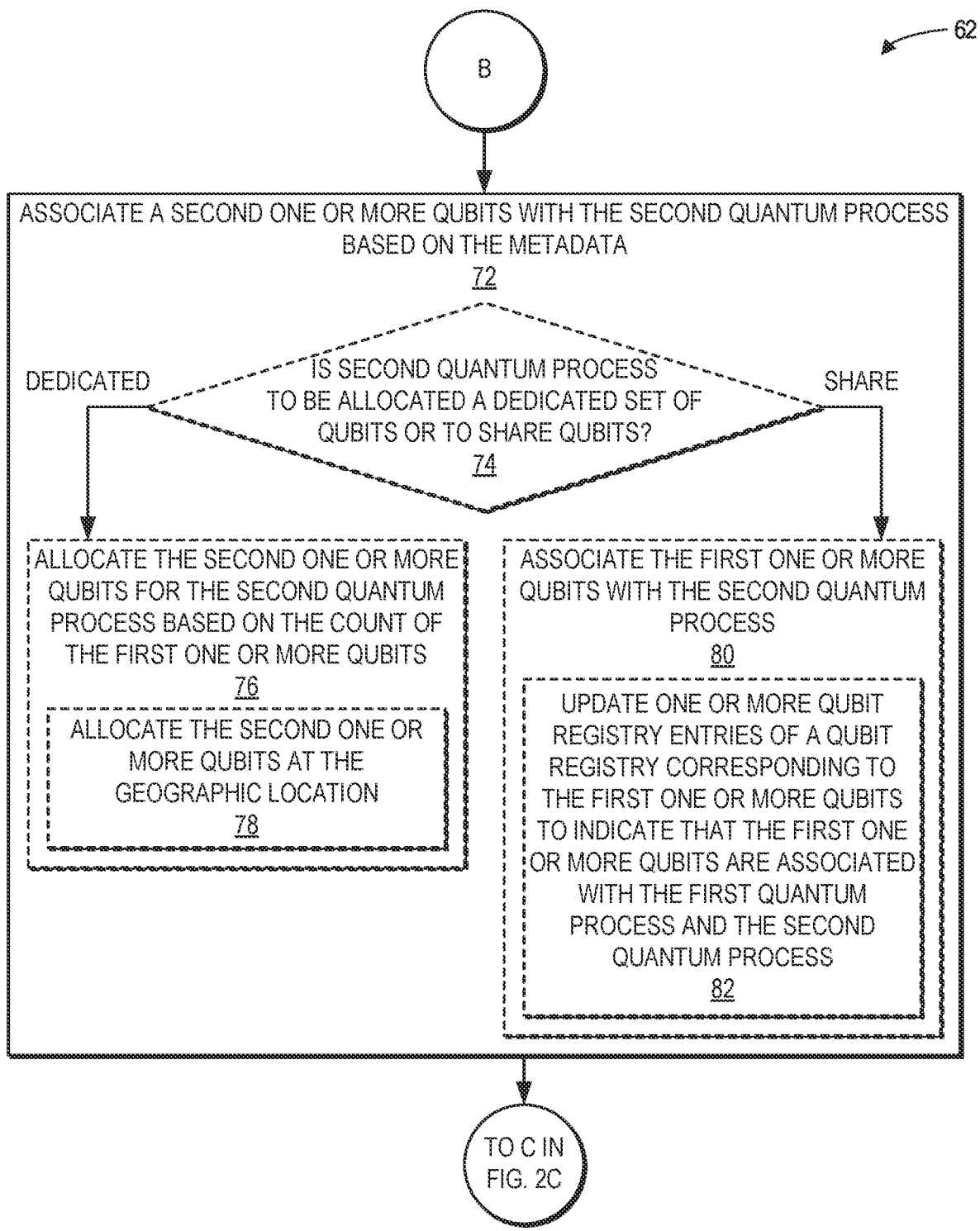
Figure 2C:
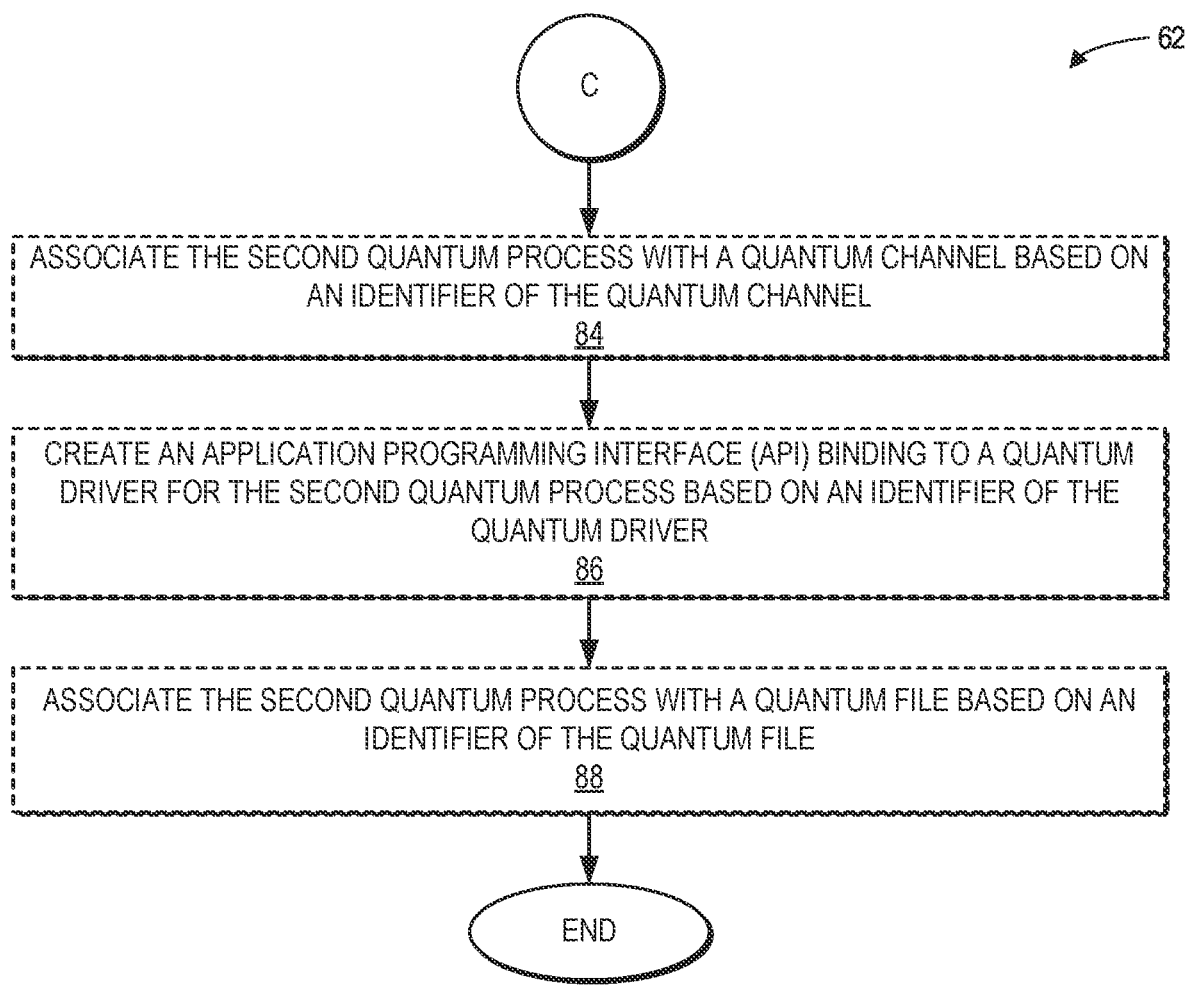

To illustrate exemplary operations of the quantum computing device 12 of FIG. 1 for performing quantum process duplication, FIGS. 2A-2C provide a flowchart 62. Elements of FIG. 1 are referenced in describing FIGS. 2A-2C for the sake of clarity. In FIG. 2A, operations according to some examples begin with the processor device 16 of the quantum computing device 12 (e.g., by executing the quantum process manager 30, as a non-limiting example) receiving the request 34 to duplicate the first quantum process 32 associated with the first one or more qubits 24(0)-24(Q) (block 64). The processor device 16 next obtains the metadata 36 associated with the first quantum process 32, wherein the metadata 36 comprises the identifier 38 of the first quantum process 32 and the identifier 40(0)-40(Q) of each of the first one or more qubits 24(0)-24(Q) (block 66). In some embodiments, the processor device 16 may verify that the first quantum process 32 is valid and running (block 68). The processor device 16 then duplicates the first quantum process 32 as the second quantum process 42 based on the metadata 36 (block 70). Operations then continue at block 72 of FIG. 2B.

Turning now to FIG. 2B, the processor device 16 associates the second one or more qubits 44(0)-44(Q) with the second quantum process 42 based on the metadata 36 (block 72). In some embodiments, the operations of block 72 for associating the second one or more qubits 44(0)-44(Q) with the second quantum process 42 based on the metadata 36 may comprise the processor device 16 first determining whether the second quantum process 42 is to be allocated a dedicated set of qubits or to share qubits (block 74). If the processor device 16 determines at decision block 74 that the second quantum process 42 is to be allocated a dedicated set of qubits, the processor device 16 allocates the second one or more qubits 44(0)-44(Q) for the second quantum process 42 based on the count 46 of the first one or more qubits 24(0)-24(Q) (block 76). Some embodiments may provide that the operations of block 76 for allocating the second one or more qubits 44(0)-44(Q) may include the processor device 16 allocating the second one or more qubits 44(0)-44(Q) at the geographic location 20 (block 78).

However, if the processor device 16 determines at decision block 74 that the second quantum process 42 is to share qubits, the processor device 16 associates the first one or more qubits 24(0)-24(Q) with the second quantum process 42 (block 80). In some embodiments, the operations of block 80 for associating the first one or more qubits 24(0)-24(Q) with the second quantum process 42 may include the processor device 16 updating one or more qubit registry entries 28(0)-28(R) of the qubit registry 26 corresponding to the first one or more qubits 24(0)-24(Q) to indicate that the first one or more qubits 24(0)-24(Q) are associated with the first quantum process 32 and the second quantum process 42 (block 82). Operations according to some embodiments then continue at block 84 of FIG. 2C.

Referring now to FIG. 2C, the processor device 16 in some embodiments may associate the second quantum process 42 with the quantum channel 22 based on the identifier 50 of the quantum channel 22 (block 84). Some embodiments may provide that the processor device 16 may create the application programming interface (API) binding 56 to the quantum driver 52 for the second quantum process 42 based on the identifier 54 of the quantum driver 52 (block 86). The processor device 16 according to some embodiments may associate the second quantum process 42 with the quantum file 58 based on the identifier 60 of the quantum file 58 (block 88).

Figure 3:
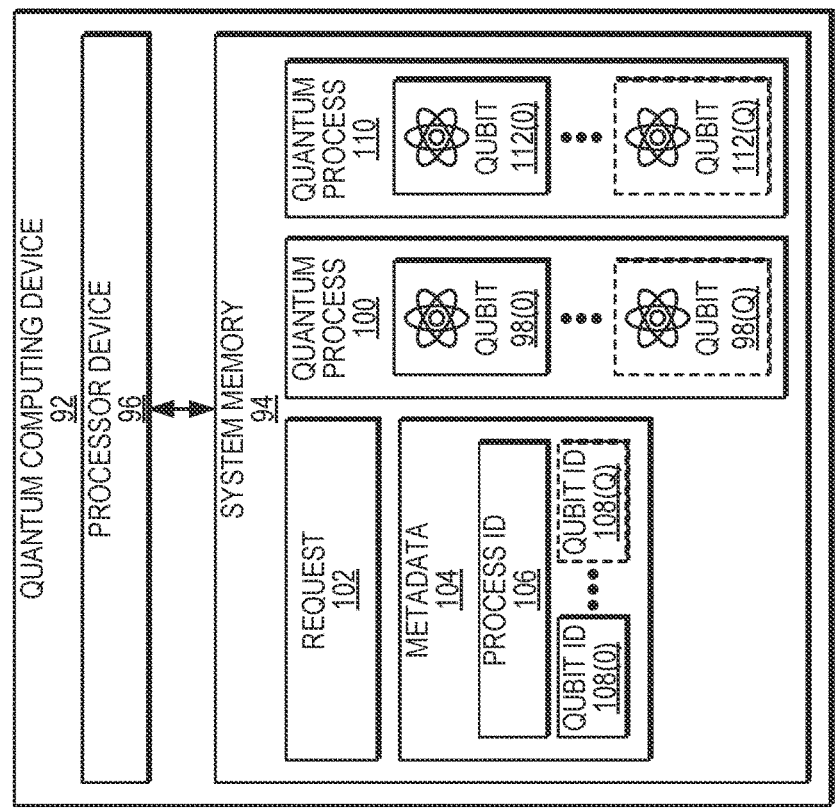
FIG. 3 is a simpler block diagram of the quantum computing device of FIG. 1 for performing quantum process duplication, according to one example.

FIG. 3 is a simpler block diagram of the quantum computing system 10 of FIG. 1 for performing quantum process duplication, according to one example. In the example of FIG. 3, the quantum computing system 90 includes a quantum computing device 92 that comprises a system memory 94 and a processor device 96. The quantum computing device 92 implements a first set of one or more qubits 98(0)-98(Q). The processor device 96 executes a quantum process 100 (also referred to herein as a "first quantum process 100") that utilizes the first one or more qubits 98(0)-98(Q). The processor device 96 is to receive a request 102 to duplicate the quantum process 100 (e.g., from a requestor such as a user or a quantum application). In response to receiving the request 102, The processor device 96 is to receive obtain metadata 104 associated with the quantum process 100. The metadata 104 includes an identifier 106 (captioned "PROCESS ID" in FIG. 3) of the quantum process 100, as well as one or more identifiers 108(0)-108(Q) (captioned "QUBIT ID" in FIG. 3) of each of the one or qubits 98(0)-98(Q) associated with the quantum process 100. The processor device 96 is then to duplicate the quantum process 100 as a quantum process 110 (also referred to herein as a "second quantum process 110") in a manner analogous to duplicating or cloning a process in conventional classical computing. The processor device 96 is also to associate a second one or more qubits 112(0)-112(Q) with the quantum process 110 based on the metadata 104.

Figure 4:
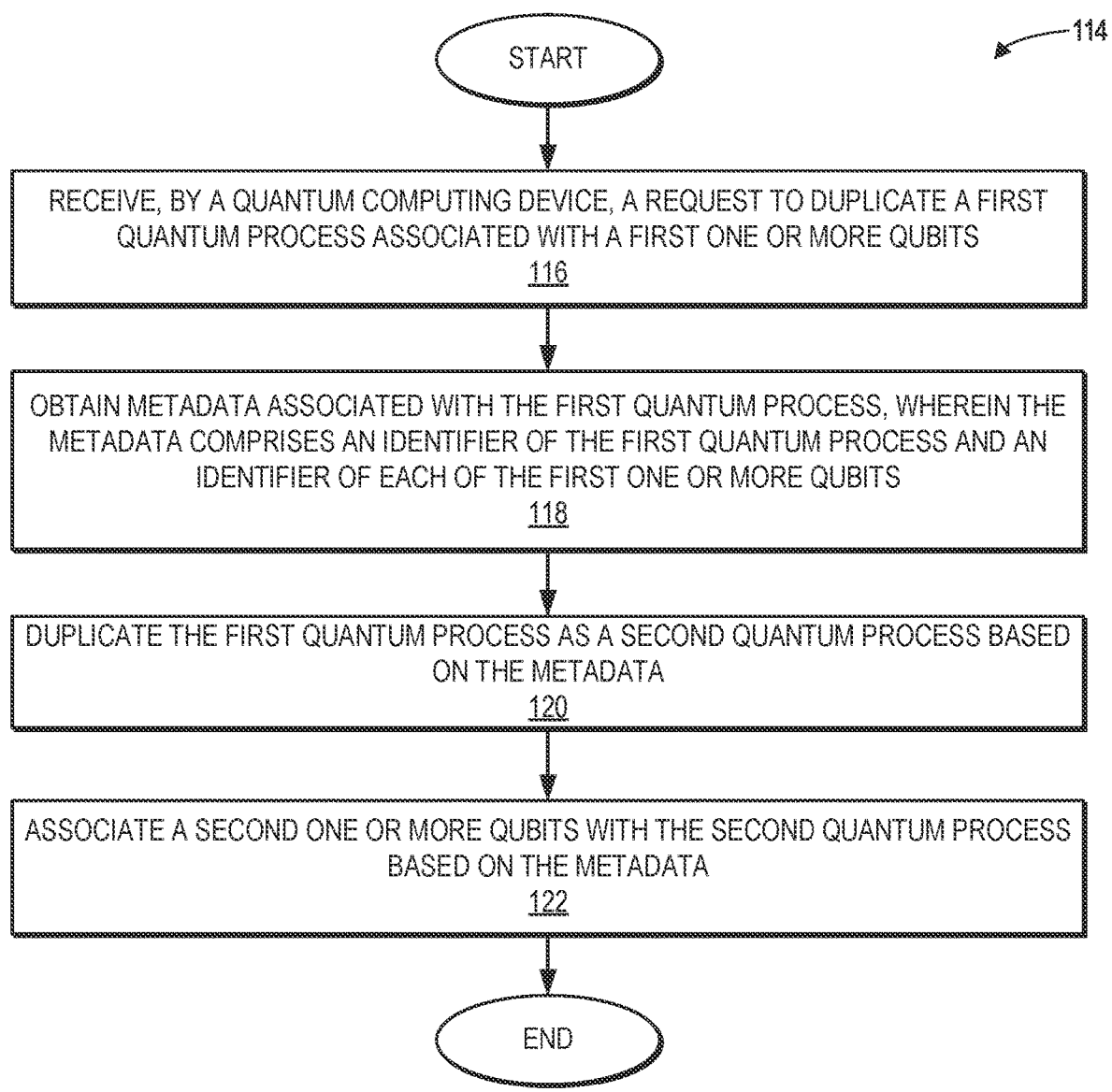
FIG. 4 is a flowchart of a simplified method for performing quantum process duplication in the quantum computing device of FIG. 3, according to one example.

FIG. 4 provides a flowchart 114 of a simplified method for performing quantum process duplication in the quantum computing system 90 of FIG. 3, according to one example. For the sake of clarity, elements of FIG. 3 are referenced in describing FIG. 4. In FIG. 4, operations begin with the processor device 96 of the quantum computing device 92 receiving the request 102 to duplicate the first quantum process 100 associated with the first one or more qubits 98(0)-98(Q) (block 116). The processor device 96 is next to obtain the metadata 104 associated with the first quantum process 100, wherein the metadata 104 comprises the identifier 106 of the first quantum process 100 and the identifier 108(0)-108(Q) of each of the first one or more qubits 98(0)-98(Q) (block 118). The processor device 96 is then to duplicate the first quantum process 100 as the second quantum process 110 based on the metadata 104 (block 120). Finally, the processor device 96 is to associate the second one or more qubits 112(0)-112(Q) with the second quantum process 110 based on the metadata 104 (block 122).

Figure 5:
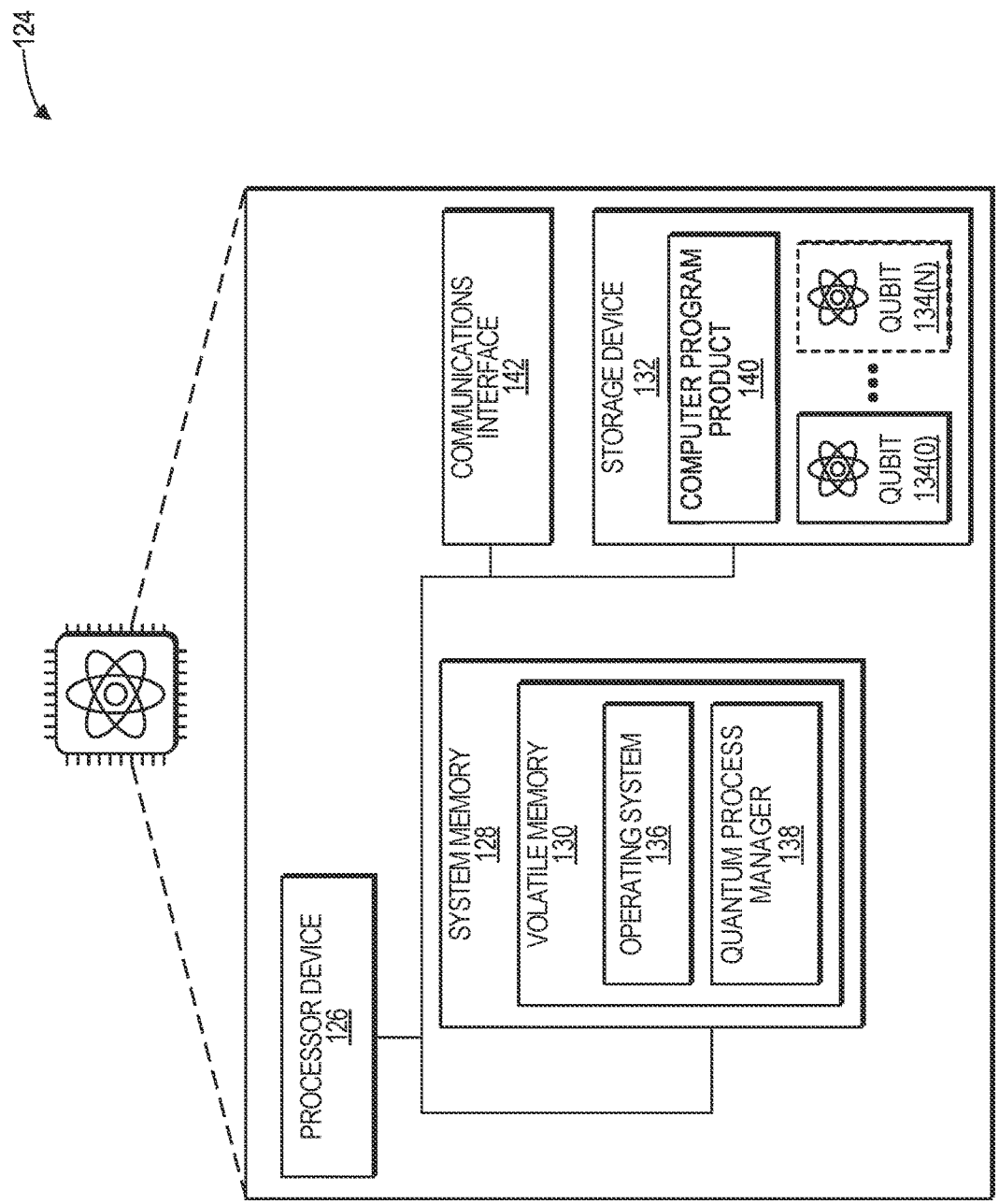
FIG. 5 is a block diagram of a quantum computing device suitable for implementing examples, according to one example.

FIG. 5 is a block diagram of a quantum computing device 124, such as the quantum computing device 12 and the quantum computing device 18 of FIG. 1, suitable for implementing examples according to one example. The quantum computing device 124 may comprise any suitable quantum computing device or devices. The quantum computing device 124 can operate using classical computing principles or quantum computing principles. When using quantum computing principles, the quantum computing device 124 performs computations that utilize quantum-mechanical phenomena, such as superposition and entanglement. The quantum computing device 124 may operate under certain environmental conditions, such as at or near zero degrees (0°) Kelvin. When using classical computing principles, the quantum computing device 124 utilizes binary digits that have a value of either zero (0) or one (1).

The quantum computing device 124 includes a processor device 126 and the system memory 128. The processor device 126 can be any commercially available or proprietary processor suitable for operating in a quantum environment.

The system memory 128 may include volatile memory 130 (e.g., random-access memory (RAM)). The quantum computing device 124 may further include or be coupled to a non-transitory computer-readable storage medium such as a storage device 132. The storage device 132 and other drives associated with computer-readable media and computer-usable media may provide non-volatile storage of data, data structures, computer-executable instructions, and the like. The storage device may also provide functionality for storing one or more qubits 134(0)-134(N).

A number of modules can be stored in the storage device 132 and in the volatile memory 130, including an operating system 136 and one or more modules, such as a quantum process manager 138. All or a portion of the examples may be implemented as a computer program product 140 stored on a transitory or non-transitory computer-usable or computer-readable storage medium, such as the storage device 132, which includes complex programming instructions, such as complex computer-readable program code, to cause the processor device 126 to carry out the steps described herein. Thus, the computer-readable program code can comprise computer-executable instructions for implementing the functionality of the examples described herein when executed on the processor device 126.

A user may also be able to enter one or more configuration commands through a keyboard (not illustrated), a pointing device such as a mouse (not illustrated), or a touch-sensitive surface such as a display device. The quantum computing device 124 may also include a communications interface 142 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a quantum computing device, a request to duplicate a first executing quantum process associated with a first one or more qubits;
   in response to the request, obtaining metadata associated with the first executing quantum process, wherein the metadata comprises an identifier of the first executing quantum process and an identifier of each of the first one or more qubits;
   duplicating the first executing quantum process as a second executing quantum process based on the metadata; and
   associating a second one or more qubits with the second executing quantum process based on the metadata.

2. The method of claim 1, wherein:
   the metadata further comprises a count of the first one or more qubits; and
   associating the second one or more qubits with the second executing quantum process based on the metadata comprises:
      determining that the second executing quantum process is to be allocated a dedicated set of one or more qubits; and
      allocating the second one or more qubits for the second executing quantum process based on the count of the first one or more qubits.

3. The method of claim 2, wherein:
   the metadata further comprises an identifier of a geographic location; and
   allocating the second one or more qubits for the second executing quantum process comprises allocating the second one or more qubits at the geographic location based on the identifier of the geographic location.

4. The method of claim 1, wherein:
   the second one or more qubits are the first one or more qubits; and
   associating the second one or more qubits with the second executing quantum process based on the metadata comprises:
      determining that the second executing quantum process is to share the first one or more qubits with the first executing quantum process; and
      associating the first one or more qubits with the second executing quantum process.

5. The method of claim 4, wherein associating the first one or more qubits with the second executing quantum process comprises updating one or more qubit registry entries of a qubit registry corresponding to the first one or more qubits to indicate that the first one or more qubits are associated with the first executing quantum process and the second executing quantum process.

6. The method of claim 1, further comprising, prior to duplicating the first executing quantum process as the second executing quantum process, verifying that the first executing quantum process is valid and running.

7. The method of claim 1, wherein:
   the metadata further comprises an identifier of a quantum channel on which the first executing quantum process is active; and
   the method further comprises associating the second executing quantum process with the quantum channel based on the identifier of the quantum channel.

8. The method of claim 1, wherein:
   the metadata further comprises an identifier of a quantum driver with which the first executing quantum process is associated; and
   the method further comprises creating an application programming interface (API) binding to the quantum driver for the second executing quantum process based on the identifier of the quantum driver.

9. The method of claim 1, wherein:
   the metadata further comprises an identifier of a quantum file with which the first executing quantum process is associated; and
   the method further comprises associating the second executing quantum process with the quantum file based on the identifier of the quantum file.

10. A quantum computing device comprising:
   a system memory; and
   a processor device coupled to the system memory to:
      receive a request to duplicate a first executing quantum process associated with a first one or more qubits;
      in response to the request, obtain metadata associated with the first executing quantum process, wherein the metadata comprises an identifier of the first executing quantum process and an identifier of each of the first one or more qubits;
      duplicate the first executing quantum process as a second executing quantum process based on the metadata; and
      associate a second one or more qubits with the second executing quantum process based on the metadata.

11. The quantum computing device of claim 10, wherein:
the metadata further comprises a count of the first one or more qubits; and
to associate the second one or more qubits with the second executing quantum process based on the metadata is to:
determine that the second executing quantum process is to be allocated a dedicated set of one or more qubits; and
allocate the second one or more qubits for the second executing quantum process based on the count of the first one or more qubits.

12. The quantum computing device of claim 11, wherein:
the metadata further comprises an identifier of a geographic location; and
to allocate the second one or more qubits for the second executing quantum process is to allocate the second one or more qubits at the geographic location based on the identifier of the geographic location.

13. The quantum computing device of claim 10, wherein:
the second one or more qubits are the first one or more qubits; and
to associate the second one or more qubits with the second executing quantum process based on the metadata is to:
determine that the second executing quantum process is to share the first one or more qubits with the first executing quantum process; and
associate the first one or more qubits with the second executing quantum process.

14. The quantum computing device of claim 13, wherein to associate the first one or more qubits with the second executing quantum process is to update one or more qubit registry entries of a qubit registry corresponding to the first one or more qubits to indicate that the first one or more qubits are associated with the first executing quantum process and the second executing quantum process.

15. The quantum computing device of claim 10, wherein the processor device is further to, prior to duplicating the first executing quantum process as the second executing quantum process, verify that the first executing quantum process is valid and running.

16. The quantum computing device of claim 10, wherein:
the metadata further comprises an identifier of a quantum channel on which the first executing quantum process is active; and
the processor device is further to associate the second executing quantum process with the quantum channel based on the identifier of the quantum channel.

17. The quantum computing device of claim 10, wherein:
the metadata further comprises an identifier of a quantum driver with which the first executing quantum process is associated; and
the processor device is further to create an application programming interface (API) binding to the quantum driver for the second executing quantum process based on the identifier of the quantum driver.

18. A computer program product comprising a non-transitory computer-readable medium having stored thereon computer-executable instructions which, when executed, cause a processor device to:
receive a request to duplicate a first executing quantum process associated with a first one or more qubits;
in response to the request, obtain metadata associated with the first executing quantum process, wherein the metadata comprises an identifier of the first executing quantum process and an identifier of each of the first one or more qubits;
duplicate the first executing quantum process as a second executing quantum process based on the metadata; and
associate a second one or more qubits with the second executing quantum process based on the metadata.

19. The computer program product of claim 18, wherein:
the metadata further comprises a count of the first one or more qubits; and
to associate the second one or more qubits with the second executing quantum process based on the metadata is to:
determine that the second executing quantum process is to be allocated a dedicated set of one or more qubits; and
allocate the second one or more qubits for the second executing quantum process based on the count of the first one or more qubits.

20. The computer program product of claim 18, wherein:
the second one or more qubits are the first one or more qubits; and
to associate the second one or more qubits with the second executing quantum process based on the metadata is to:
determine that the second executing quantum process is to share the first one or more qubits with the first executing quantum process; and
associate the first one or more qubits with the second executing quantum process.

* * * * *